Figure 1:
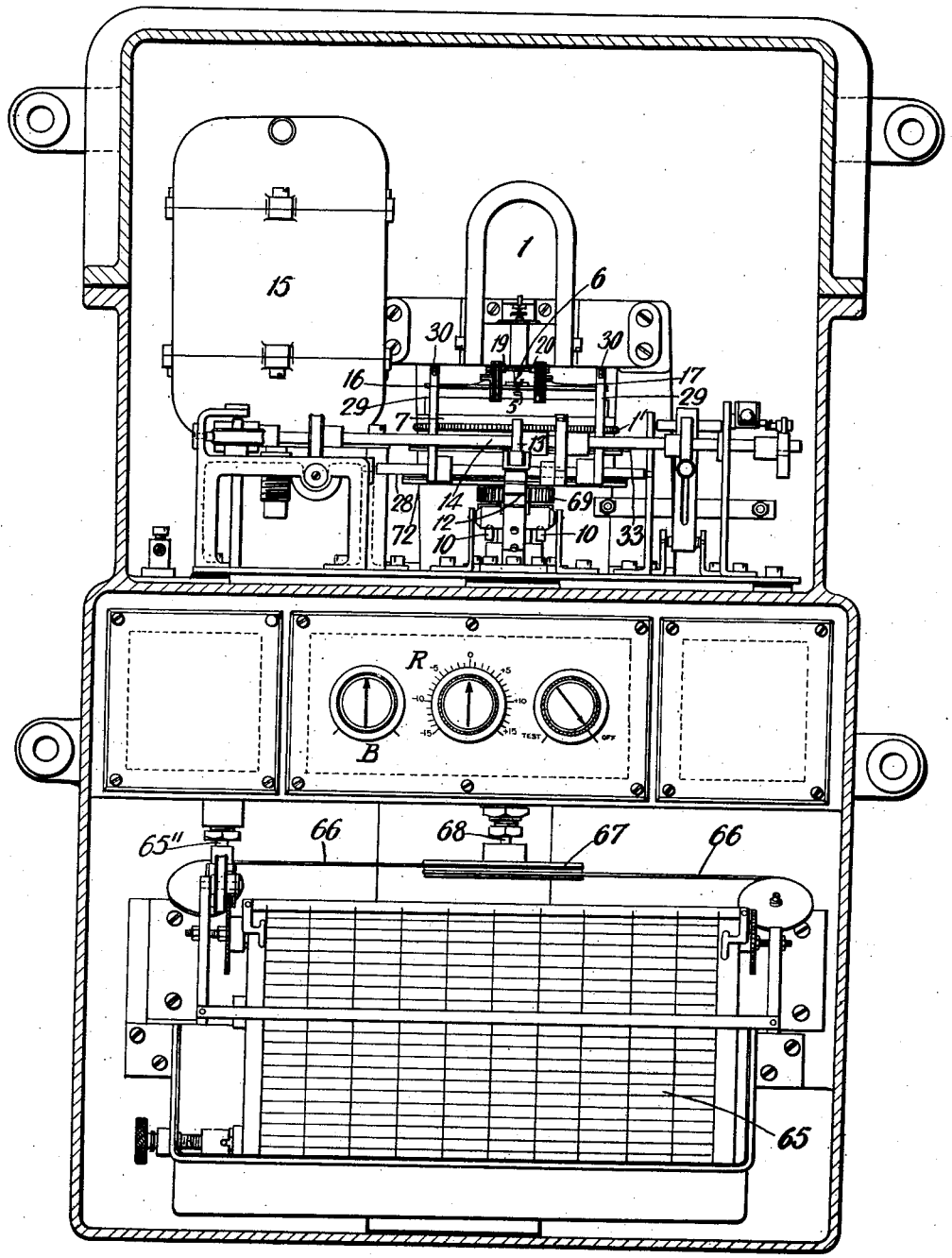

July 4, 1933.  J. L. HODGSON ET AL  1,916,477
AUTOMATIC CONTROL APPARATUS
Filed Aug. 22, 1931   12 Sheets-Sheet 1

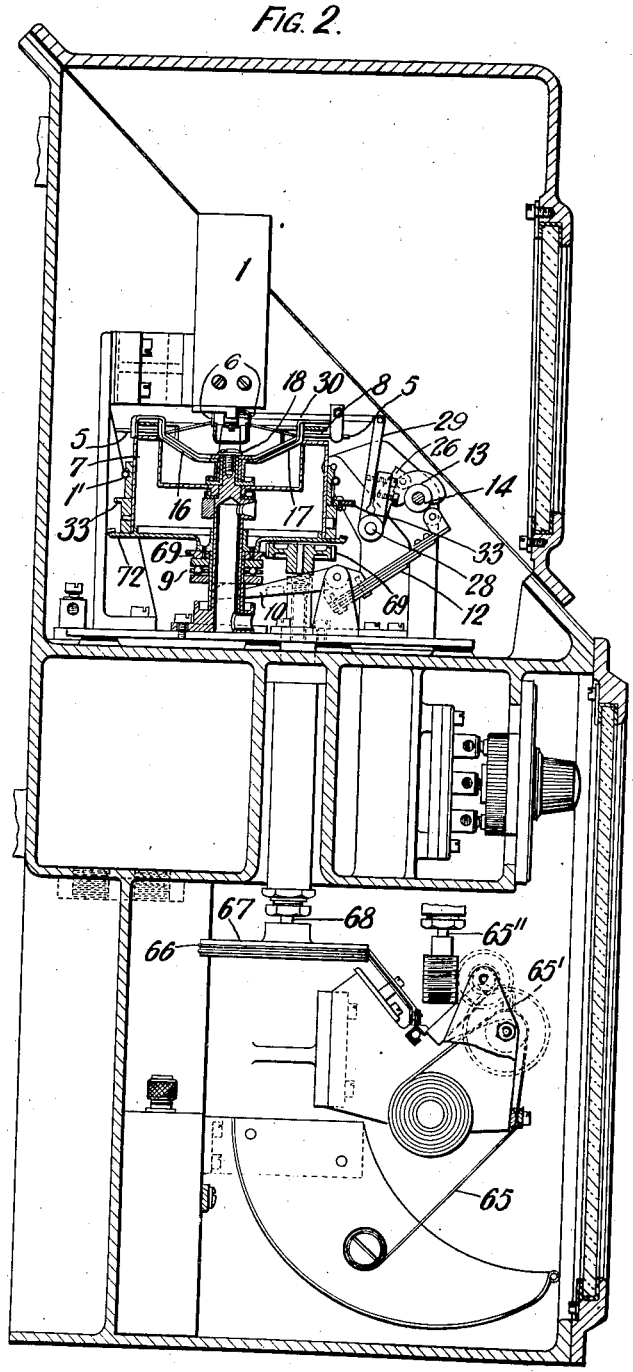

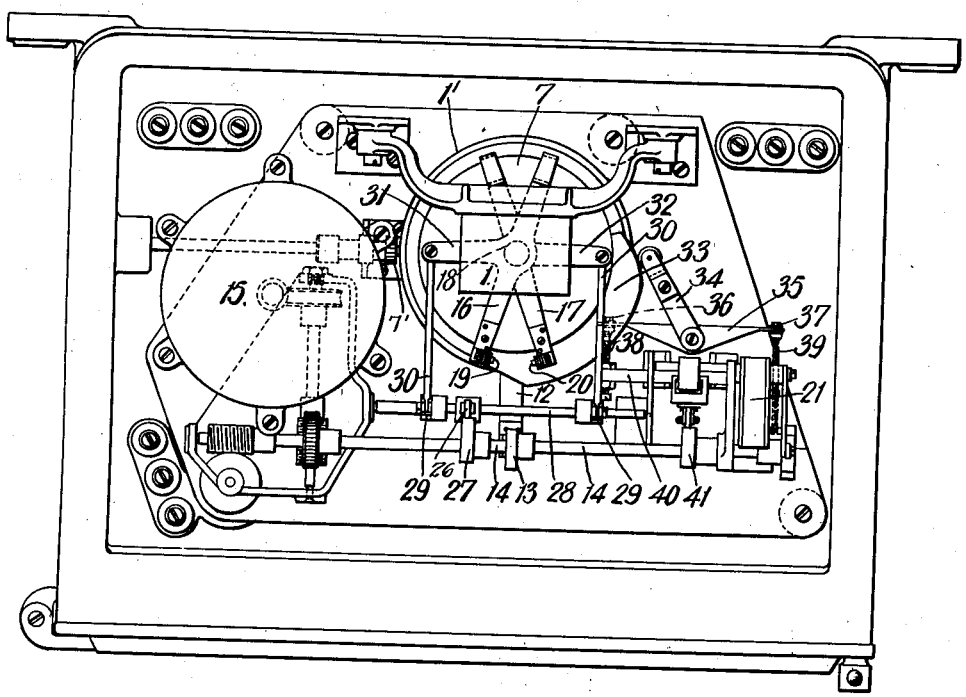
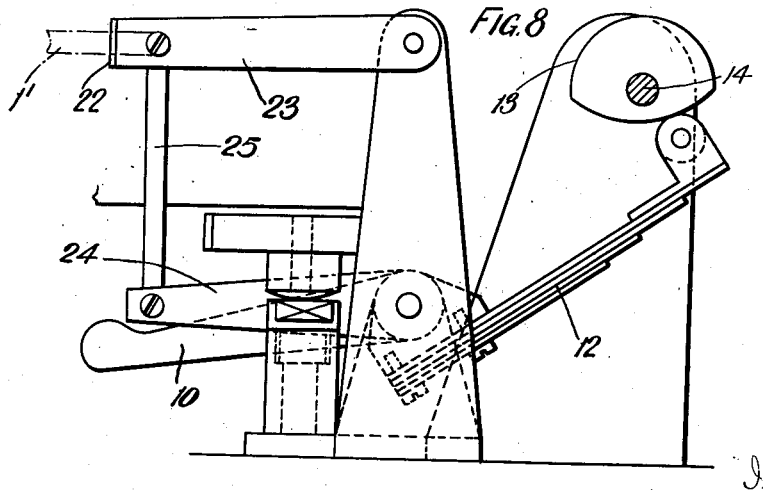

July 4, 1933.   J. L. HODGSON ET AL   1,916,477
AUTOMATIC CONTROL APPARATUS
Filed Aug. 22, 1931   12 Sheets-Sheet 6

July 4, 1933.  J. L. HODGSON ET AL  1,916,477
AUTOMATIC CONTROL APPARATUS
Filed Aug. 22, 1931   12 Sheets-Sheet 7
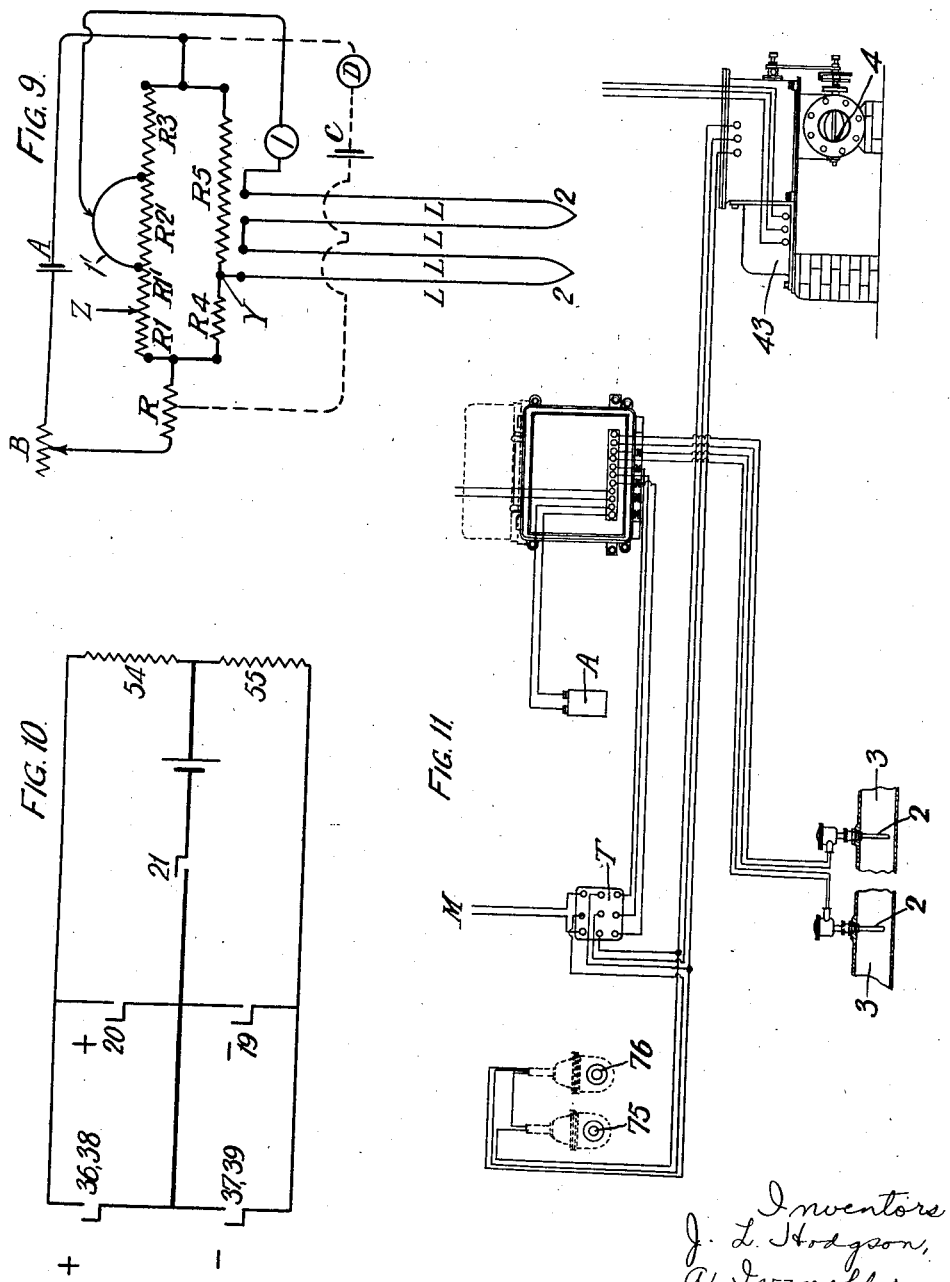

July 4, 1933.  J. L. HODGSON ET AL  1,916,477
AUTOMATIC CONTROL APPARATUS
Filed Aug. 22, 1931   12 Sheets-Sheet 9
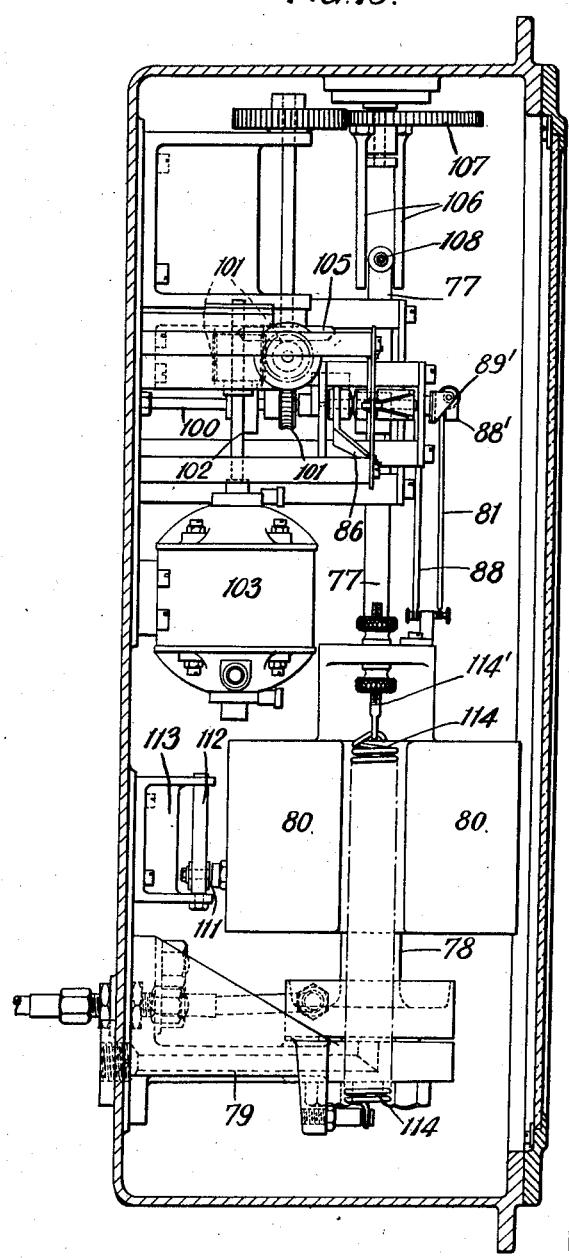
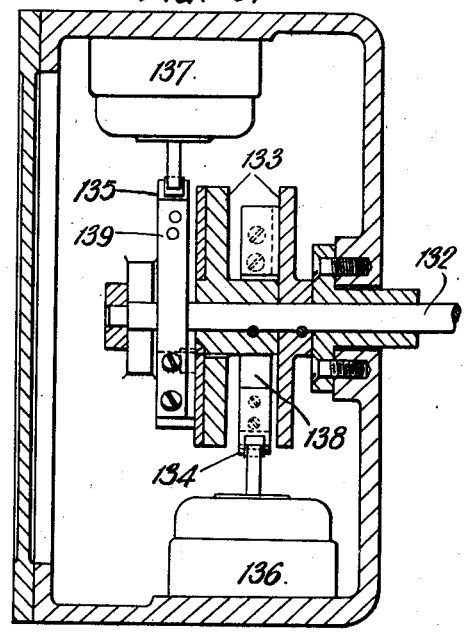
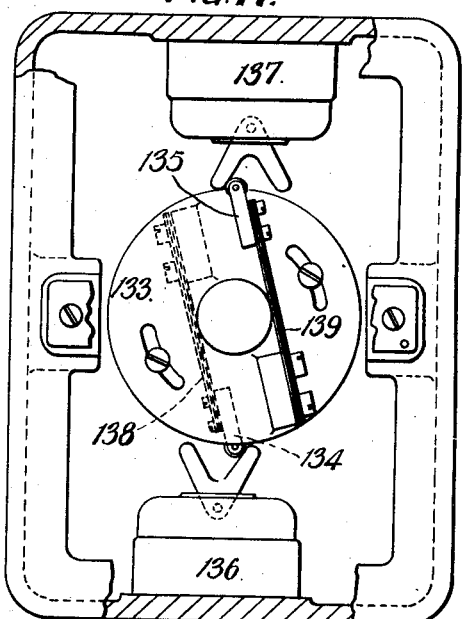

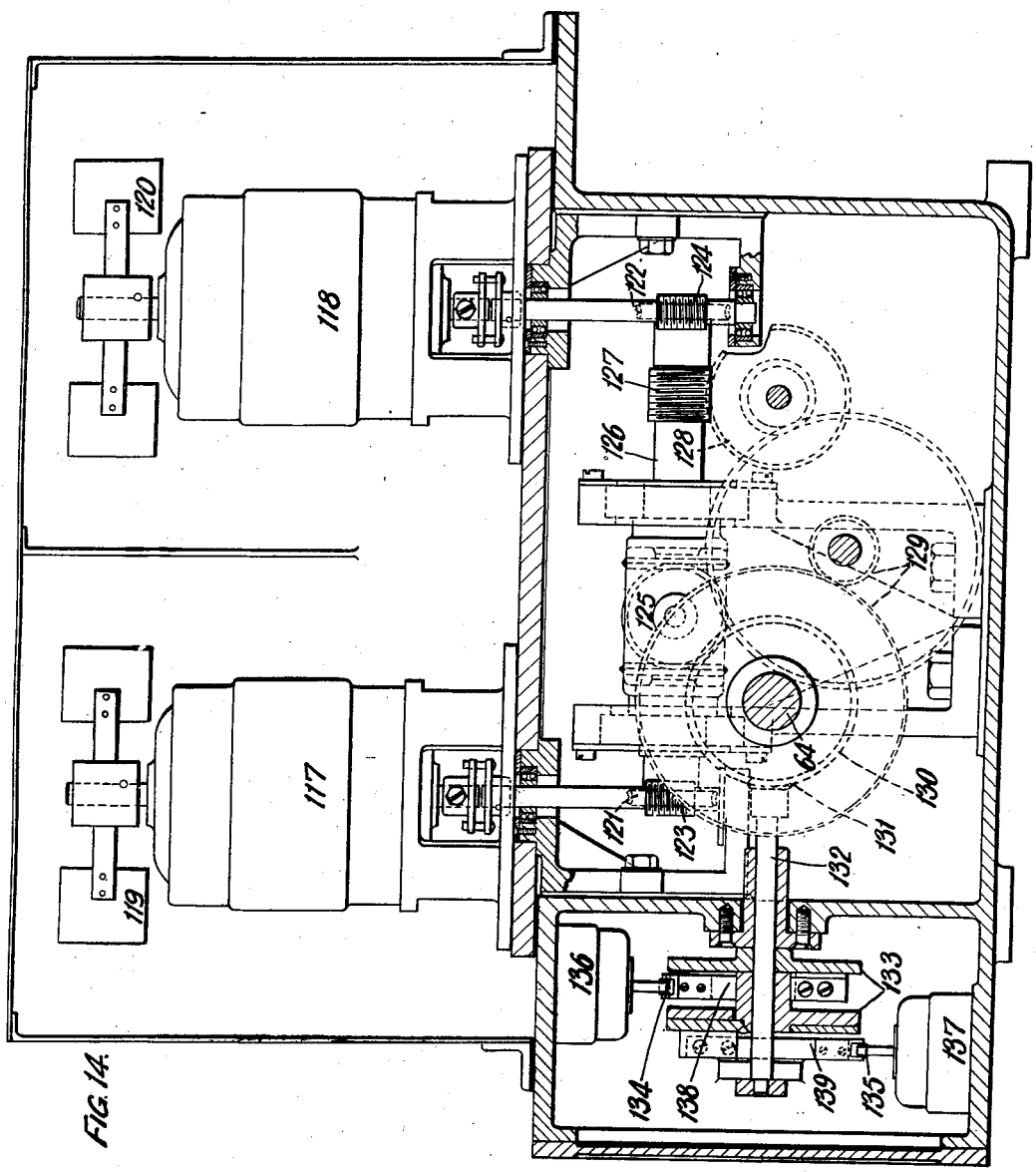

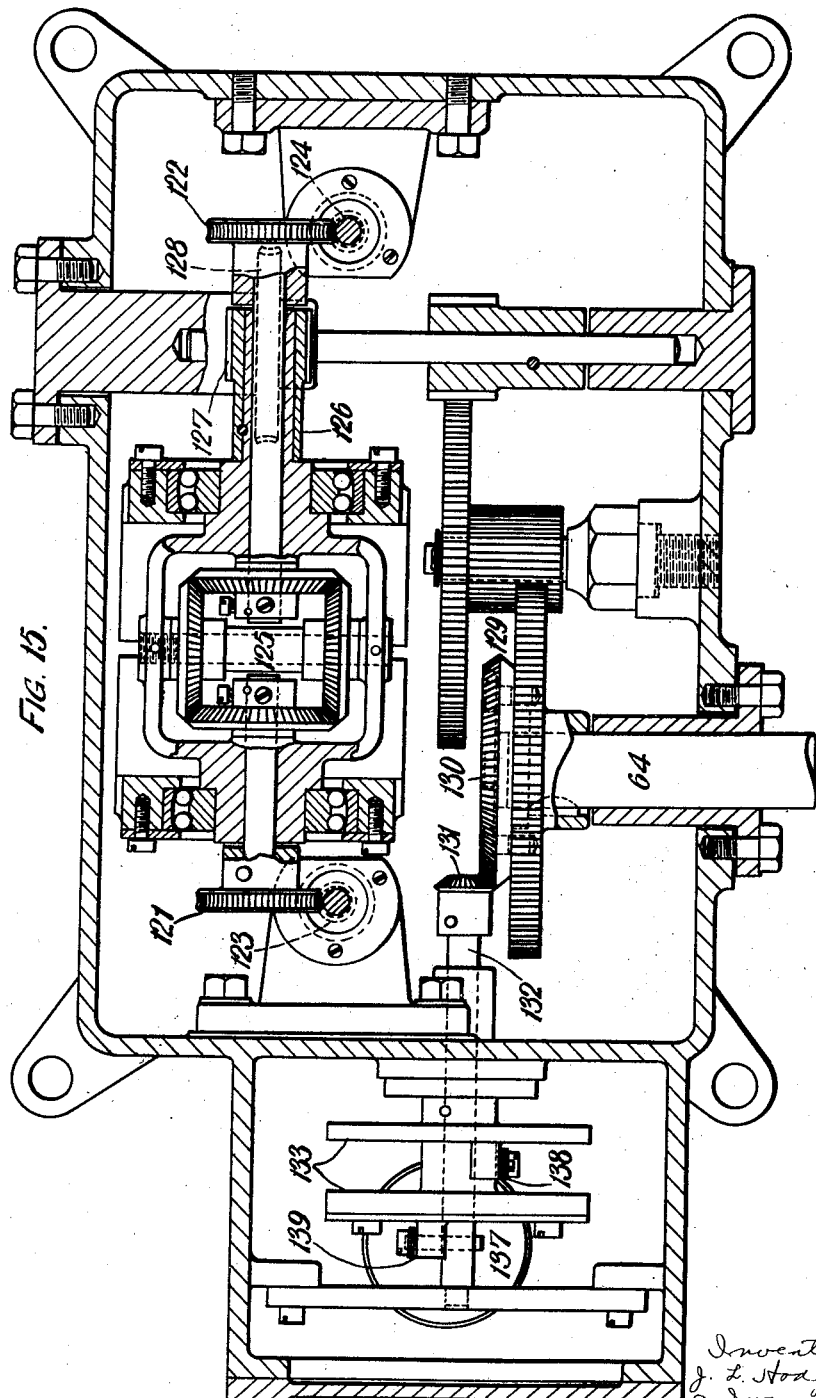

July 4, 1933.  J. L. HODGSON ET AL  1,916,477
AUTOMATIC CONTROL APPARATUS
Filed Aug. 22, 1931    12 Sheets—Sheet 12
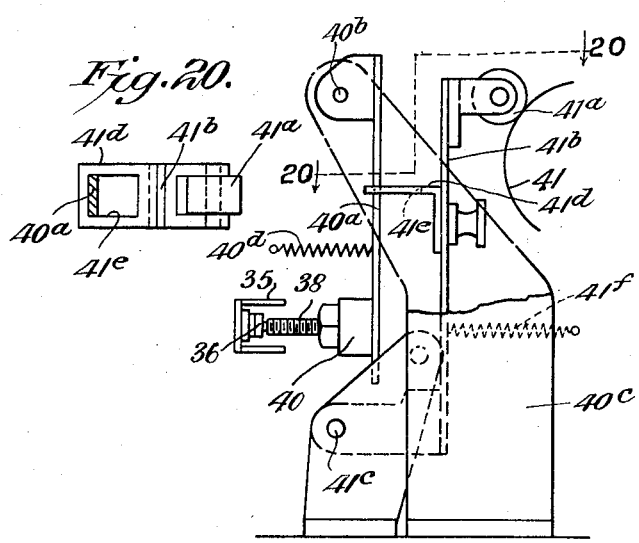
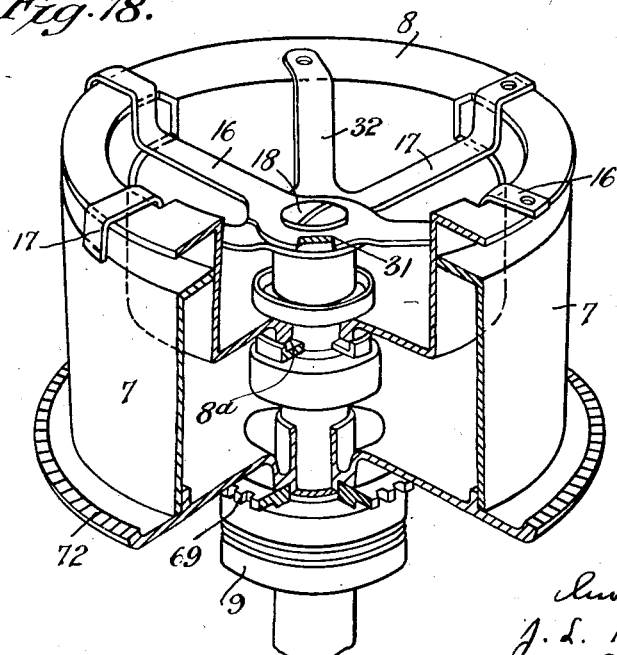

Patented July 4, 1933

1,916,477

UNITED STATES PATENT OFFICE

JOHN LAWRENCE HODGSON, ALEXANDER IVANOFF, AND GILES PHILIP ELIOT HOWARD, OF LUTON, ENGLAND, ASSIGNORS TO GEORGE KENT, LIMITED, OF LONDON, ENGLAND

AUTOMATIC CONTROL APPARATUS

Application filed August 22, 1931, Serial No. 558,822, and in Great Britain August 29, 1930.

The present invention relates to the control, at a predetermined steady or varying value of a physical condition (such as the direction of a ship, the steam pressure in a boiler header, or the temperature of a circulating liquid heated by a gas-fired furnace) irrespective of whether there is an appreciable time interval between the movement of the control and the observed response of the condition to be controlled; and/or in which response to the controls when once started tends to persist unless checked.

According to this invention movements which are approximately proportional to the positive and negative "rates of change" and to the positive and negative "deviations" from the predetermined condition are obtained by suitable means, and the movement of the controls is made such that a positive "rate" or a positive "deviation" will produce a negative motion of the controls, and vice versa. Thus, if the "rate" and the "deviation" are both positive (as they will be immediately after a disturbance in the positive direction from the predetermined condition), the controls must be moved vigorously in the negative direction; but if the "rate" is negative and the "deviation" is positive (as they will be when returning to the predetermined condition after a disturbance in the positive direction) there must be little or no motion of the controls.

The simplest method of effecting the required motion of the controls is to make their motion dependent upon positive or negative motions which are approximately proportional to the positive or negative "rates" and "deviations" observed. Thus, if shutting down a valve corresponds to a negative movement of the controls, and opening it to a positive movement, a control valve which is periodically adjusted will be shut down a given amount during such successive time interval whenever the "rate" is positive and also whenever the "deviation" is positive, i. e. there will be two successive shutting down motions during each of the successive time intervals when the "rate" and "deviation" are both positive. On the other hand, if the "rate" is negative while the "deviation" is still positive (as will be the case when there is a return to the desired steady condition after a disturbance in the positive direction), this will necessitate first an opening motion and then a shutting motion which motions will tend to counteract one another.

The invention provides means for suitably combining these motions, so that instead of the two short closing motions in the first case considered above, there is one long closing motion which may conveniently be made proportional to the sum of the two closing motions or to whichever of these closing motions is the longer (hereinafter referred to as the superposed sum) and instead of an opening motion followed by a shutting motion in the second case, there is a small net opening or closing motion which may conveniently be made proportional to the difference (i. e. to the algebraic sum) of the two motions.

It is possible by thus obtaining during successive time intervals motions dependent upon the positive and negative "rates" and "deviations" from the desired steady condition, and causing the controls during these successive time intervals to move an amount dependent upon motions proportional to these intervals and superposed according to their sign, to restore the desired steady conditions very quickly after a disturbance.

By suitably adjusting the relative magnitudes of the "rate" and "deviation" movements, and of the movement of the controls which is dependent upon their algebraic or superposed sum to suit the physical characteristics, (such as lag in response, inertia, and the like) of the apparatus controlled return to the desired steady condition can be effected without hunting. It can also be arranged that when the "deviation" or "rate" become excessive the controls can be made to move more vigorously or for a larger proportion of the successive time intervals.

Our invention also includes means for taking the product or ratio of these motions (electrically or otherwise) so that when they are both positive or both negative the motion of the controls will be proportional to their product, and when one is positive and one is negative proportional to their ratio. Our invention provides means for adjusting the relative magnitudes both of the "rate" and of the "deviation" movements, and also the speed of movement of the controls during the time that they are in operation. By manipulating these adjustments, the most suitable return to the predetermined condition can be obtained in each particular case.

The following description shows how the invention could be applied to controlling the temperature of circulating liquid heated by a gas fired furnace, using a potentiometer temperature measuring device in which a thermo-couple is immersed in the circulating liquid whose temperature at the measuring point it is desired to maintain at a predetermined steady or varying value. In such a temperature measuring device, it is usual to check the balance of the potentiometer at frequent intervals of time (say, once every 20 seconds), and, if the galvanometer in the thermo-couple circuit shows positive or negative deviation, to move the potentiometer balance point a proportional amount until the balance is obtained. In such a device, the deviation of the balance point from the desired steady temperature is a measure of the "deviation" to be corrected, while the deflection of the galvanometer in the thermo-couple circuit, is an approximate measure of the "rate" at which the temperature is changing. Thus, if the controls have been moved too far, the potentiometer may at any particular reading be at the desired balance point, but the galvanometer will swing a considerable distance during the next time interval, showing that the rate of change of temperature is still appreciable.

In one method of obtaining this movement proportional to this "rate", the galvanometer pointer is clamped at the beginning of the time interval at the deflection which it has at the commencement of that interval, and arms provided with electric pneumatic or hydraulic "contacts" are moved up against it at a steady rate so as to return it to zero, and to operate the potentiometer. The time during which these "contacts" are "on" in the positive or negative directions thus depends upon the deflection of the galvanometer from its mean position. In this way, movements which are dependent upon the rate of change of the temperature of the circulating liquid are obtained. In a similar way, "contacts" can be made for time intervals which are approximately proportional to the positive or negative "deviations" of the potentiometer balance point from the desired predetermined temperature. One way of doing this is to fix contacts on a member which is deflected an amount proportional to the "deviation". If now a second and flexibly mounted member carrying corresponding contacts is moved up in a direction parallel to the undeflected position of the first member at a rate which is governed by the rate of motion of the centralizing arms described above, the contacts will be closed during a time interval which is dependent upon the observed "deviation".

In order to effect control, it is now only necessary to start, stop and reverse a motor which operates the control valve through gearing at a sufficiently slow rate, for the periods of the time intervals during which the contacts above described are made. In order however to avoid cancelling out an adjustment already made by reversing the motor, as would be necessary with the above arrangement when returning to the desired steady condition after a disturbance (when the "rate" is negative while the "deviation" is still positive), it is necessary to have a device which will enable the algebraic sum or the superposed sum, according to their positive and negative values, of these time intervals to be taken, so that cancellation of the actual motion of the control device is rendered unnecessary.

One such device consists of a continuously running shaft on which driving worms are mounted. Worm wheels which can be pulled into gear by solenoids are adapted to engage with these worms and drive the control valve through a differential gear. If neither worm wheel is engaged with its worm, the control valve will remain stationary. The gearing is such that if both worm wheels are in engagement with their worms, the two sides of the differential gear will be rotated at equal speeds in opposite directions, so that the intermediate spindle through which the control valve is connected through gearing will again not move. If only one of the worm wheels is in gear with its worm, the control valve will move in the appropriate direction. This device therefore enables a motion of the valve proportional to the algebraic sum or the superposed sum of the time intervals corresponding to the positive and negative "rates" or "deviations" referred to above to be obtained, as if when the valve is moving the worm which moves the control valve in the opposite direction is pulled into gear, the motion is immediately stopped, while the longer of the two motions, when these are of the same signs, is always allowed to produce its full effect. Another such device consists of two flexible tubes carrying fluid jets under pressure, which jets normally discharge into ports which are connected to the two ends of a cylinder provided with a piston which operates the control valve. If both or neither of these jets discharge into their respective ports, the piston will not move; if only one, the piston will move in the appropriate direction. The flexible tubes carrying the jets are operated by magnets or solenoids and replace the worm wheels in the device above described. The algebraic or the superposed sum of the two time intervals may also be obtained by electrical means, as for instance if a polarized relay which operates the motor which moves the control valve is connected up in an electrical circuit which resembles a Wheatstone bridge, but in which the two "ratio arms" can be closed by the contacts. It will be seen that if one ratio arm is closed current will flow through the relay in one direction, while if the other ratio arm is closed, current will flow through the relay in the opposite direction. If neither or both arms are closed, no current will flow through the relay.

It is necessary on any such valve operating device to fix upper and lower limits of the motion permitted. For instance, in the event of failure of the control apparatus, it may be desirable not to allow the valve to open up to such an extent that serious overheating would occur; while it is also necessary not to allow the gear box to jam the valve in the "shut" position, so that the gear box must be thrown out of action before such jamming can occur.

A convenient arrangement of potentiometer mechanism for purposes of temperature control consists of a cylindrical drum which is pivoted about its own axis and around which the slide wire of the potentiometer is fixed. Above it, and moving about the same axis, is a galvanometer whose pointer is carried on hooks. This drum moves upwards a short distance at frequent intervals, and in so doing lifts the pointer off its hooks without strain to the galvanometer suspension and clamps it against a plate which is also pivoted about the same axis. Two centralizing arms then move the clamped pointer to a central position, and in so doing turn the potentiometer drum until balance is obtained. To prevent damage to the mechanism when a suppressed zero is used, a projection may be fitted to the drum which will prevent further deflection of the pointer and hence motion of the drum towards the zero when once the lower limit of the range of the potentiometer has been reached.

Figure 4:
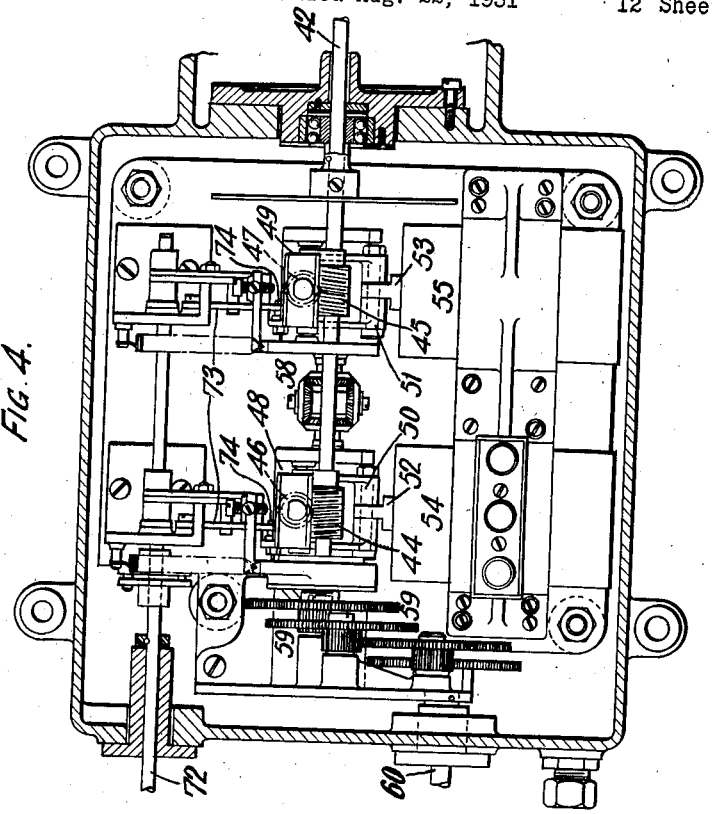
Figure 5:
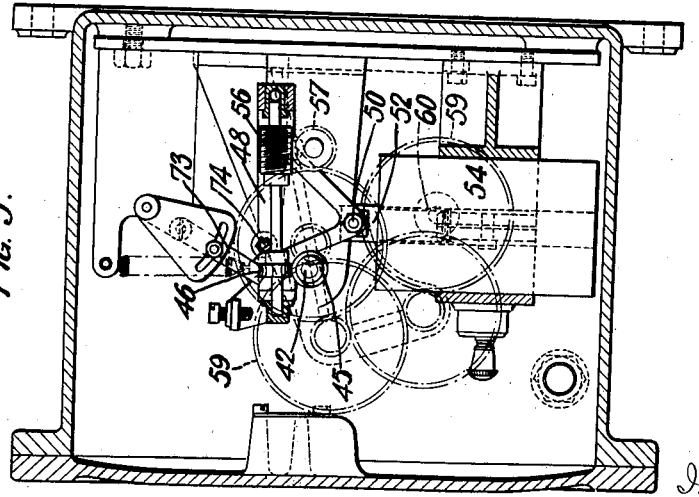
Figure 6:
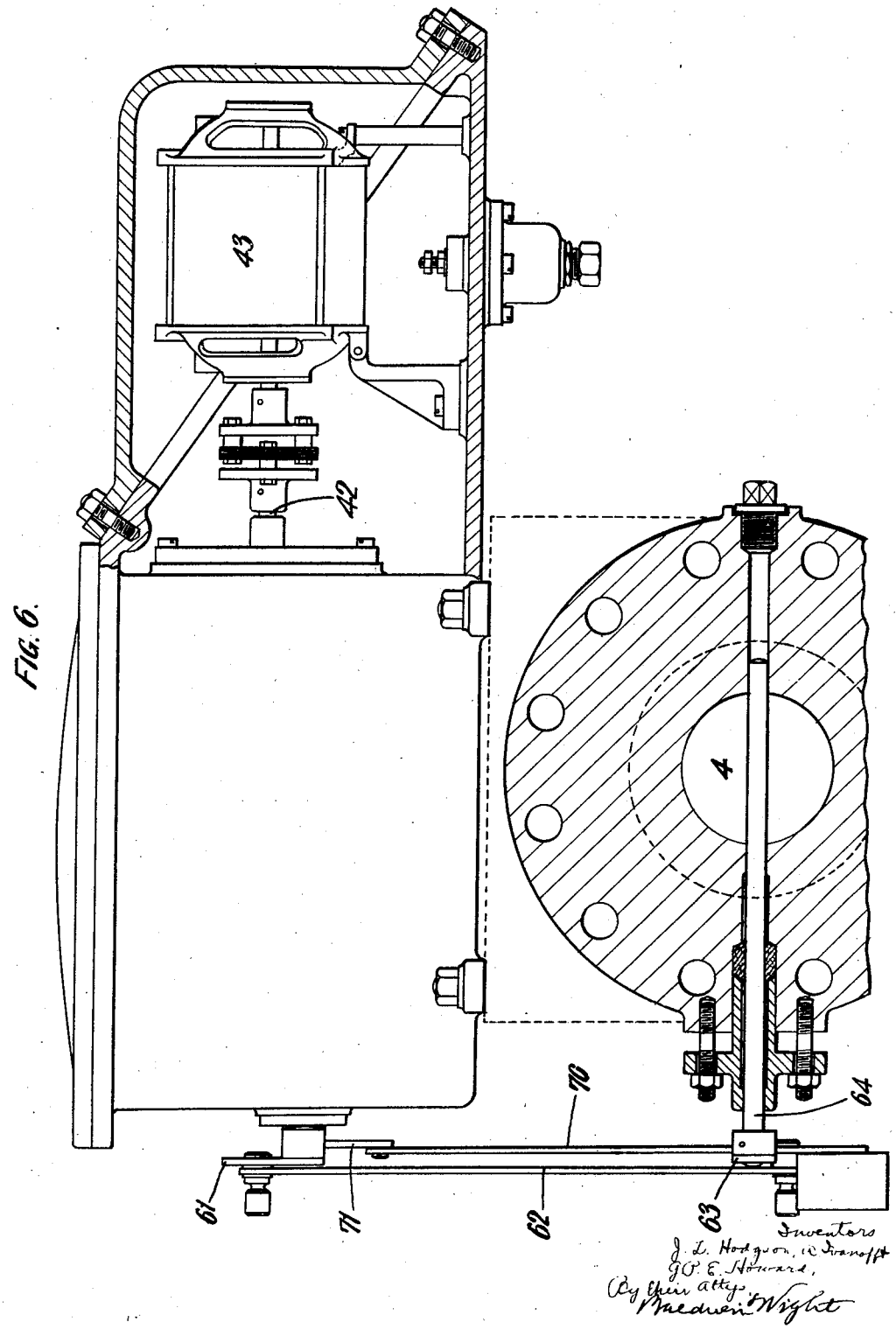
Figure 7:
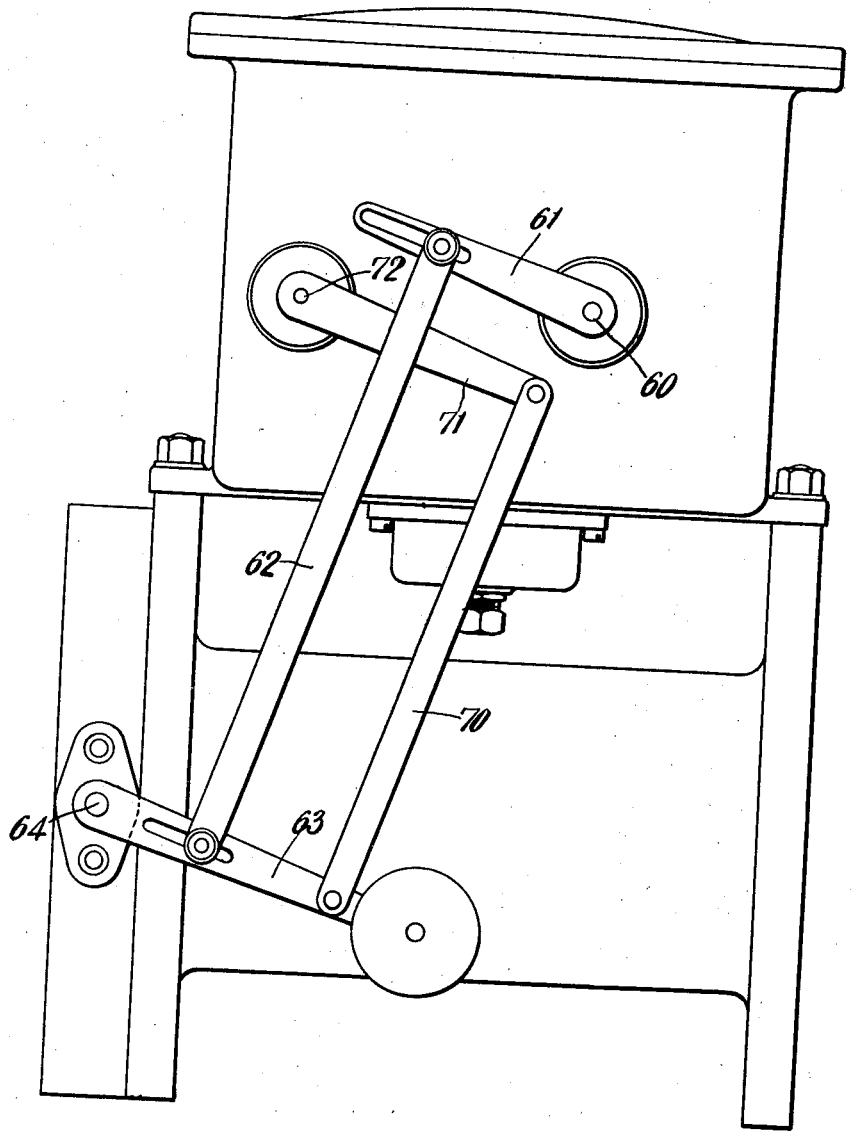
Figure 12:
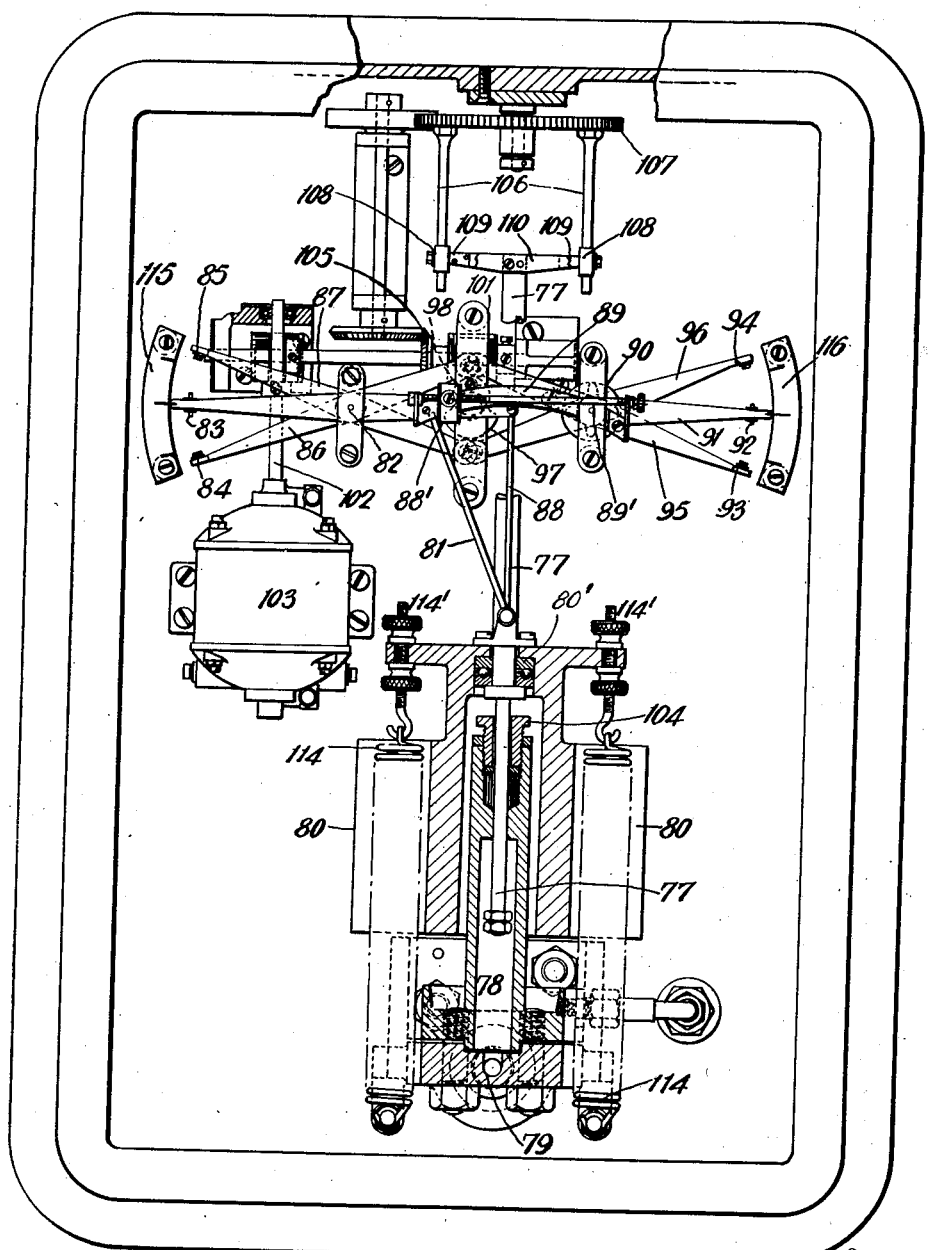

The invention is illustrated in the accompanying drawings, in which Figure 1 is a front elevation partly in section; Figure 2 an elevation at right angles to Figure 1, also partly in section; Figure 3 a plan view; Figure 4 a plan view partly in section of the control mechanism; Figure 5 an elevation partly in section at right angles to Figure 4; Figure 6 a side elevation partly in section of the control mechanism and the control valve, and Figure 7 an elevation at right angles to Figure 6. Figure 8 is a detail view to a larger scale, Figure 9 is a diagram of a potentiometer circuit, Figure 10 is a diagram of an electrical control circuit including contacts the closing and opening of which determines the movement to be imparted to a valve or other control element, and Figure 11 a diagram showing the lay-out of an installation. Figures 12 and 13 are views at right angles to one another of a modified form of construction and Figures 14–17 views of a further modified form of construction. Figure 18 is a perspective view of a potentiometer drum and associated parts which are shown in Figures 1, 2, and 3 but drawn on an enlarged scale. Figure 19 is a detail view in side elevation of cam actuated mechanism for operating a contact making arm which is shown in plan in Figure 3; and Figure 20 is a sectional view taken on the line 20—20 of Figure 19.

Referring firstly to the arrangement shown in Figures 1 to 11 inclusive:

1 is a galvanometer which is included in the circuit of thermo couples 2 mounted in a pipe line 3 through which flows a circulating liquid which is heated by a gas fired furnace and whose temperature has to be controlled, the control being effected by a valve 4.

The circuit arrangement is shown in the diagram Figure 9, which shows the galvanometer 1 included in a circuit with two thermo couples 2; the slide wire 1' of a potentiometer is supplied with current of constant value from an accumulator A of the slow discharge type. The circuit is adjusted by a rheostat B so that the voltage drop across the slide wire is that of a standard cell C, which, together with a galvanometer D, can be switched into the circuit for testing purposes. R2' is a shunt across the slide wire to bring it to the desired value after it is fitted to its drum. The circuit is also adjusted so that when the temperature of the thermo couples is that shown by the potentiometer the pointer 5 of the galvanometer has zero deviation, while a deviation of the pointer whether positive or negative will be proportional to the increase or decrease of the temperature at the thermo couples.

The pointer 5 is supported on hooks 6 carried by the armature of the galvanometer, and the pointer is clamped to a potentiometer drum 7 in the position of deviation, which (assuming that the temperature has varied from the desired value) it takes at the first part of each short time interval, for example, twenty seconds. The clamping is effected by a ring 8 which is supported for rotation as at 8ª and with which co-operates the potentiometer drum which is supported through a ball thrust bearing 9 by a lever, one arm 10 of which is forked and engages the lower race of the ball thrust bearing, and the other arm of which is formed by a laminated spring 12 having a roller engaging a cam 13 on a shaft 14 driven through a reduction gearing by an electric motor 15, the shaft being driven through one revolution for each time interval. The ring 8 is mounted for rotary movements relative to the drum 7, but is maintained against axial movements, the arrangement being such that when the drum is raised the pointer 5 will be clamped between the axially moved drum and the non-axially movable ring 8.

After the clamping of the pointer to the drum has been effected, the shaft 14 causes a pair of arms 16, 17 freely pivoted at 18, and having contacts 19, 20, to move towards a central position. The contact on one or other of the arms, according to whether the deviation is positive or negative, will engage the pointer for a period depending on the extent of the deviation of the pointer, and the pointer will be returned to a central or no deviation position by that arm, and as the pointer is clamped to the potentiometer drum, the potentiometer slide wire 1' will be returned to a position of balance. A slide 22 contacts with the slide wire, and in order to avoid unnecessary rubbing between the slide and the slide wire as the drum is raised and lowered, the slide wire contact is carried by arcs 23, 24, linked by a link 25, the whole forming a parallelogram (see Figure 8). The potentiomter drum is now allowed to move out of clamping engagement with the pointer, which latter again takes up a position depending on the value of the temperature, whereupon the operation is repeated during the next time interval and so on.

It will be seen that by continuing this operation through a number of short time intervals, a measure will be obtained of the rate of change of the temperature of the liquid the time during which the contacts are closed, in the positive or negative direction, depending on the successive increments of deviation of the pointer from its mean position.

The movement of the arms 16-17 into central position is effected by a lever 26 which engages a cam 27 on the shaft 14, this lever 26 being fast with a shaft 28 having arms 29 adjustably mounted thereon and connected by links 30 to extensions 31, 32 on the arms.

In order to obtain movements which are proportional to the deviation of the potentiometer from the balance point corresponding to the temperature value desired, the potentiometer drum is provided with a cam plate 33 engaged by a roller on an arm 34 secured to a pivotally mounted plate 35 carrying contacts 36, 37 so that the angular position of the plate and hence of the contacts will depend on the deviation. 38 and 39 are contact studs which are fixed to the opposite ends of a plate 40 carried by an arm 40ª pivoted as at 40ᵇ to a bracket 40ᶜ. A cam 41 on the shaft 14 engages a roller 41ª carried by a plate 41ᵇ pivoted at 41ᶜ to the bracket 40ᶜ. An angle piece 41ᵈ is secured to the plate 41ᵇ and is formed with an opening 41ᵉ through which the arm 40ª passes. The arm 40ª and the plate 40 are urged to the left by a spring 40ᵈ and consequently the contact studs 38 and 39 are urged towards the contacts 36 and 37 respectively. The roller 41ª is maintained in contact with the cam 41 by means of a spring 41ᶠ secured to the plate 41ᵇ. When, during rotation of the shaft 14, the cam 41 moves the roller and plate 41ᵇ to the left as viewed in Figure 19, thereby releasing the arm 40ª, the spring 40ᵈ will move the plate 40 to the left until the contact stud 38 engages the contact 36, or the contact stud 39 engages the contact 37, depending upon the angular position of the pivoted plate 35. During continued rotation of the shaft 14, when the cam 41 permits the plate 41ᵇ to move to the right under the urge of the spring 41ᶠ, the angle piece 41ᵈ will drag the arm 40ª to the right. The contact studs 38 and 39 are moved to the left once during each time interval, and the period during which contact is made depends upon the angular position of the plate 35 and hence upon the extent of deviation. At the end of the re-setting operations the circuits in which the contacts are inserted are broken by a mercury switch 21 actuated by a cam on the shaft 14.

In order to utilize the contacting periods proportional to the rate of change and to the deviation for effecting control, the arrangement shown in Figures 4-7 is employed.

In this arrangement there is provided a shaft 42 which is driven continuously at a constant speed by an electric or other motor 43 and is provided with previously threaded worms 44, 45. Each of these worms is adapted respectively to mesh with a worm wheel 46, 47 carried on pivotally mounted brackets 48, 49 which are pivotally connected at 50, 51 to the plungers 52, 53 of solenoids 54, 55 which are included in the circuits of the contacts perviously described and as shown in the diagram Figure 10. Each worm wheel is fast with a worm of which only one is shown at 56 in mesh with a gear wheel 57 each worm wheel being connected to one side of a differential gear indicated generally at 58, the driven side of the differential gear being placed by reduction gear 59 into driving connection with a spindle 60, having an arm 61 adjustably connected by a link 62 to an arm 63 secured to the spindle 64 of the valve 4.

It will be seen that if neither worm wheel 46, 47 is moved into mesh with its worm 44, 45 or if both worm wheels are moved into mesh, the valve 4 will not be moved, the two sides of the differential being rotated, when both worm wheels are in mesh with their respective worms, at the same speed in opposite directions so that no drive will be transmitted to the valve 4. If, however, only one of the worms 44, 45 moves into mesh with its worm wheel the differential gear will transmit drive to the control valve which will be moved in the appropriate direction. The device thus enables a motion of the valve proportional to the algebraic sum or the superposed sum of the positive or negative rates and of the deviations to be obtained. As shown in Figure 10, the deviation extent contacts 36–38 and the rate of change of deviation contact 20 are connected in circuit with the solenoid 54 while the extent contacts 37–39 and the rate of change of deviation contact 19 are connected in circuit with the solenoid 55. The circuit arrangement is such that the mercury switch 21 is common to both circuits, as is the source of electrical energy indicated in Figure 10 as a battery, it being understood, however, that the electrical energy may be derived from a transformer connected to a power line as indicated in Figure 11.

To illustrate the operation, two cycles each with different conditions will now be described, referring particularly to Figure 10.

1. The deviation is positive and the temperature is rising. Contacts 36, 38 and 20 will be made and the valve will close during a time interval corresponding to whichever time interval is greatest and an amount which is dependent upon the gear ratio between the worm shaft and the valve controlled.

2. The "deviation" is positive, but the temperature is falling. In this case contacts 36, 38 and 19 will be made, and the movement of the valve will be proportional to the time interval between the closing of the two contacts. The valve will tend to open if the "rate" contact 19 is made before the "deviation" contact 36, 38 is made and to close if the deviation contact 36, 38 is made before the "rate" contact 19. No motion of the valve will be made at all if both of the contacts 36, 38 and 19 are made simultaneously.

It is usually preferable to adjust the instrument in such a way that for more than a small deviation the controlled rate of return is considerably increased by steepening the deviation cam 33 at each side of the central point.

In order to provide a record of the temperature, there is provided a chart 65 over which moves a pen 65' moved by a cable 66 wound round a pulley 67 which is driven through a spindle 68 and gear 69 from the potentiometer drum 7 so that the position of the pen on the chart will depend on the extent to which the drum is moved due to deviation. In order to limit the movement of the valve the arm 63 is provided with a second link 70 which is coupled to an arm 71 on a spindle 72 carrying detent members 73 which are adapted, when the valve is in its limiting position to engage detent pins 74 on the brackets 48 and thus to prevent the worm wheels from moving into mesh with the worms even when the solenoids are actuated.

Push buttons 75 and 76, which superimpose impulses on the impulses sent from the controller, are provided to allow control of the valve to be obtained either at the instrument itself or from a distance. If for any reason these impulses sent are incorrect or inadequate, as by jamming of the push buttons or failure of the electric current, the valve 4 would be disconnected from the control apparatus and operated by hand, or at least put in the full open position so that control can be effected by hand operated valves placed in the same pipe line.

The most suitable curve by which the temperature is brought to the normal will vary with the particular use for which the controller is required.

The relation between the deviation and the rate is determined by the shape of the cam 33 on the drum 7 (see Figure 3), the rate at which the contacts 38, 39 move towards the contacts 36, 37 and the rate at which the valve 4 moves when the appropriate contacts are made, and in order to provide for a variation in the relation, the shape of the cam can be varied, and the rate of movement of the contacts and of the valve can be adjusted.

The speed of response of the control can also be varied by providing means for varying the time of the electrical impulses.

In order to compensate for the cold junction temperature there are provided in the circuit shown in Figure 9, resistances R, R1, R1', R3, R4 and R5 in addition to the resistance R2' and the slide wire 1'. The resistances R1, R1', 1', R2' and R3 are in parallel with the resistances R4 and R5, and the resistances are such that the current through each arm is practically the same. With the exception of the resistance R4, which is of nickel, all the resistances are of constantin which has practically no temperature coefficient. Under normal conditions of temperature the points Y and Z will have the same potential when the system is balanced. If the atmospheric temperature rises the electro-motive force generated by the thermo couples falls off but the value of the resistance R4 increases, producing an additional potential drop across the galvanometer. This is employed for compensating for the fall in the electro-motive force due to the cold junction. Compensating leads LLLL, which are preferably made of the same materials as the thermo couples to which they are attached are brought to a point near to R4 in the instrument so that the cold junction may be at this point. In order to compensate for the varying characteristics of similar thermo couples the standardized current through the potentiometer resistances may be varied by altering the total resistance across which the voltage drop is measured when standardizing. This can be effected by an adjustment of the calibrated rheostat R.

The temperature at which the liquid is desired to be maintained can be varied by rotating the potentiometer drum 7 by means of a bevel wheel 7' which meshes with a bevel fast with the potentiometer drum 7. A projection at the end of 7' is adapted to enter a hole in the cam ring 33, so locking the cam ring and the cam in the mid position. The drum 7 is then turned to the desired temperature as indicated by a pen hereinafter referred to. Current for the solenoids is supplied from a main M through a transformer T which reduces the main voltage to a suitable value.

Figures 12 and 13 show the invention as modified for use as the master controller of a boiler control mechanism. In this arrangement there is provided a pressure responsive member 77 in the form of a slowly rotating piston whose lower end extends into an oil chamber 78 placed in communication with a steam heater or other convenient point through a pipe 79. This piston is loaded by a metal block 80 which is supported through a thrust race 80' by a collar on the piston.

The piston is connected by a link 81 to an arm pivotally mounted at 82 and having a contact stud 83 which is engaged by one or other of a pair of contacts 84, 85 on arms 86, 87 which are moved at regular time intervals towards a central position. The piston is also connected by a link 88 to an arm 89 which is coupled through a friction clutch 90 to an arm 91 provided with a contact stud 92 which is adapted to be engaged by contacts 93, 94 on a pair of arms 95, 96 which are also moved towards a central position synchronously with the arms 86, 87. The link 88 is coupled to the arm 89 through an adjustable device to enable the distance of the pivotal connection between the link and arm from the pivotal point of the arm 89 to be varied; this is effected by connecting the link 88 to a block 88' which is adjustable on the arm 89 by a screwed rod 89'. 115 and 116 are pressure scales, 115 indicates the actual pressure worked at, and 116 is a scale which shows the change of pressure during each cycle, that is the rate of change of the pressure. The movement of the arms 86, 87, and 95, 96 is effected against the action of springs by cams 97, 98 on a shaft 100 driven through worm and worm wheel gearing 101 and a shaft 102 from an electric motor 103.

In operation the arms 86 and 87 are moved at regular intervals towards the central position so that one or other of the contacts 84 or 85 may meet the contact stud 83 which is moved from its zero position if there is any deviation from the desired pressure. Once contact is made with the stud 83, movement of the contact 84 or 85, which has made it, ceases so that contact is made for a period which is dependent upon the departure of the pressure from the desired pressure; and by continuously effecting contacts in this way a succession of contacting time periods are obtained, each of which is dependent upon the deviation from the desired pressure.

The contacts 93 and 94 on one or other of the arms 95 and 96 similarly engage the contact stud 92 on the arm 91, but in so doing they return this arm to its central position the friction clutch 90 allowing a relative movement to take place between the arm 89 and the arm 91. This contact is made for a time period which depends upon the rate of deviation, and this contacting period and also the period dependent upon the "deviation" are employed to effect the actuation of some suitable device which controls the amount of heat supplied to the boiler; for example, in the manner described in Figures 4–7 or in Figures 15, 16 and 17.

The shape of the cams 97, 98 which actuate the "deviation" arms 86, 87 and "rate" arms 95, 96 may be varied to give the best relations between "deviation" and "rate" and the cam 97 which operates the deviation arms 86 and 87 is suitably shaped to prevent the deviation from ever getting very great. For example assuming the allowable deviation to be plus or minus 2½ lbs. and the cam 97 to be so shaped that whenever the deviation exceeded 2 lbs., the contacts were in practically continuously, there would be a big movement of the controls whenever the deviation exceeded the desired amount.

The slow rotation of the piston 77 avoids lack of sensitivity in the pressure measurement caused by friction between the pitson 77 and its gland 104, rotation of the piston being effected by the electric motor 103 through bevel gearing 105. The drive is transmitted through driving posts 106 which are secured to a gear wheel 107 driven by the gearing 105 and are engaged by rollers 108 mounted on blade springs 109 secured to a cross member 110 secured to the piston 77, this arrangement permitting the piston freely to rise and fall while still being rotated, also allowing for any slight errors in the axial alignment of the driving shafts. In order to prevent the weight 80 partaking of the rotation of the piston 77, it is provided with a roller 111 which engages a reaction abutment in the form of a fixed post 112, a post 113 also being provided to prevent the weight from being accidentally pushed rearwardly.

The piston 77 is additionally loaded by tension springs 114 which are secured at their lower ends to fixed abutments and at their upper ends to adjusting screws 114' carried by flanges on the weight so that an adjustment of the total loading can be obtained.

It will be seen that the deviation and rate measuring devices shown in Figures 1 and 2 and in Figures 12 and 13 are enclosed in gastight cases. Referring particularly to Figures 1 and 2, the spindle 68 which transmits motion of the slide wire to the pen passes through a gland. A spindle 65" which is driven by the motor 15, for driving the chart 65 passes through a second gland while temperature setting mechanism, which is actuated by the wheel 7' Figure 3 also passes through a gland in the wall of the case.

Figures 14, 15, 16 and 17 illustrate a modified form of construction for effecting actuation of the control valve or other member, there are provided two similar motors 117, 118 which are similarly damped by fan brakes 119, 120 and are included in circuit with contacts such as those described with reference to Figures 1–11 or 12 and 13. The damping of the motors may if desired be effected by any other convenient damping mechanism such as a magnetic brake consisting of a disc of aluminium, copper or other conducting material mounted to rotate between the poles of a powerful magnet. These motors are adapted to drive worm wheels 121, 122 through worms 123, 124, and these worm wheels are connected to opposite sides of a differential gear 125 the central hollow shaft 126 of which is connected through a worm 127 and worm wheel 128 and reduction gearing 129 to the valve spindle 64, the actuation of the two motors and hence of the differential gear and valve being similar in principle to that described with reference to Figures 3 and 4.

The spindle 64 is also provided with a bevel gear 130 which is in mesh with a bevel pinion 131 secured to a shaft 132 having fast therewith a member 133 provided with operating members 134, 135 for operating limit switches 136, 137 which stop the motion of the motors 117, 118 when the desired amount of movement of the valve 4 has been allowed, the operating members 134, 135 being carried by springs 138, 139 to ensure a quick action in both directions of the switches.

It will be obvious that the predetermined condition controlled by apparatus constructed according to this invention could be not only a steady condition but also a varying one, such for example as a condition which would vary with some time schedule or with a momentary or temporary demand on a steam boiler.

It should be understod that the invention is not limited to the control of temperatures or boiler pressures or to the particular means for carrying it out which we have described.

What we claim is:—

1. In apparatus for automatically controlling a condition of a fluid which depends upon its heat content, the combination of means responsive to the extent of deviation of said condition from a predetermined value; means responsive at intervals to the increment of deviation of the condition from that of a preceding interval to ascertain the rate of change; a device operatively connected with said deviation extent responsive means; a device operatively connected with said deviation rate responsive means; a control means adapted to effect change of said condition of the fluid; and a differential gearing connected to said control means for transmitting drive to the latter and being operable under conjoint control of said deviation extent responsive means and said deviation rate responsive means in dependence on the relative values of extent of deviation and rate of deviation.

2. In apparatus for automatically controlling a condition of a fluid which depends upon its heat content, the combination of means responsive to the extent of deviation of said condition from a predetermined value; means responsive at intervals to the increment of deviation of the condition from that of a preceding interval to ascertain the rate of change; a device operatively connected with said deviation extent responsive means; a device operatively connected with said deviation rate responsive means; a control means adapted to effect change of said condition of the fluid; a differential gearing operatively connected to said control means for transmitting drive to the latter; a continuously operating member; and devices adapted under independent control of rate and deviation to effect driving connection between said continuously operating member and the respective opposite sides of said differential gearing in dependence on the relative values of extent of deviation and rate of deviation.

3. In apparatus for automatically controlling a condition of a fluid which depends upon its heat content, the combination of means responsive to the extent of deviation of said condition from a predetermined value; means responsive at intervals to the increment of deviation of the condition from that of a preceding interval to ascertain the rate of change; a device operatively connected with said deviation extent responsive means; a device operatively connected with said deviation rate responsive means; a control means adapted to effect change of said condition of the fluid; a differential gearing operatively connected to said control means; a continuously rotating shaft; a pair of worms thereon; and a pair of worm wheels having driving connection with the respective sides of the differential gearing and being movable independently into mesh with the respective worms under control of said deviation extent responsive device and said deviation rate responsive device respectively in dependence on the relative values of extent of deviation and rate of deviation.

4. In apparatus for automatically controlling a condition of a fluid which depends upon its heat content, the combination of means responsive to the extent of deviation of said condition from a predetermined value; means responsive at intervals to the increment of deviation of the condition from that of a preceding interval to ascertain the rate of change; a device operatively connected with said deviation extent responsive means; a device operatively connected with said deviation rate responsive means; a control means adapted to effect change of said condition of the fluid; a differential gearing operatively connected to said control means; a pair of independently operable electric motors having driving connection with the respective input sides of the differential gearing; and means for starting and stopping said motors under control of said deviation extent responsive device and said deviation rate responsive device respectively in dependence on the relative values of extent of deviation and rate of deviation.

5. In apparatus for automatically controlling a condition of a fluid which depends upon its heat content, the combination of a potentiometer device in which change is automatically produced in response to the extent of deviation of said condition from a predetermined value; means for intermittently balancing the potentiometer; a member mounted for movements to positions dependent on the total extent of balancing movement; a second member adapted successively to assume positions dependent on the successive extents of balancing movement; a pair of arms engageable with the second member for moving it to zero position; electrical contacts on said arms either of which is adapted to close an electric circuit when its associated arm is in engagement with said second member; means responsive to an extent dependent on the position of the first member; means independently responsive to an extent dependent on the instantaneous position of the second member; a control element adapted to effect change of said condition; and means for actuating said control element under the conjoint control of said members whereby the extent of actuation will vary in dependence on the relative values of rate and deviation of said condition.

6. In apparatus for automatically controlling a condition of a fluid which depends upon its heat content, the combination of a potentiometer device in which change is automatically produced in response to the extent of deviation of said condition from a predetermined value; means for intermittently balancing the potentiometer; a member mounted for movements to positions dependent on the total extent of balancing movement; a galvanometer in circuit with said potentiometer and having a movable armature; a hook on said armature; a pointer normally carried by said hook and being adapted successively to assume positions dependent upon the successive extents of balancing movement; means for freeing said pointer from said hook and clamping said pointer to said potentiometer device when said pointer is in a position of deviation; means for then moving said pointer to a position of no deviation while free from said hook; means responsive to an extent dependent on the position of the first member; means independently responsive to an extent dependent on the instantaneous position of said pointer; a control element adapted to effect change of said condition; and means for actuating said control element under the conjoint control of said member and said pointer whereby the extent of actuation will vary in dependence on the relative values of rate and deviation of said condition.

7. In apparatus for automatically controlling pressure; a device mounted for movements in response to the deviation of pressure from a predetermined value; a first member mounted for movements to positions determined by the positions of said device whereby the position of said member is dependent upon deviation; a second member adapted to be set by said device; a friction clutch connection between said second member and said pressure responsive device; means for intermittently moving said second member to its zero position whereby movements of said second member are dependent upon the rate of change of pressure; means mounted for movements in response to and to an extent dependent upon the position of said first member; means mounted for movements in response to and to an extent determined by the instantaneous position of said second member; a control element adapted to effect change of said pressure; and means for effecting actuation of said control element under conjoint control of said first and second members whereby the extent of actuation of said control element will vary in dependence upon the relative values of deviation and rate.

8. In apparatus for automatically controlling pressure; a constantly rotating piston mounted for axial movements in response to the deviation of pressure from a predetermined value; a first member mounted for movements to positions determined by the positions of said piston whereby the position of said member is dependent upon deviation; a second member adapted to be set by said piston; means for intermittently moving said second member to its zero position whereby movements of said second member are dependent upon the rate of change of pressure; means mounted for movements in response to and to an extent dependent upon the position of said first member; means mounted for movements in response to and to an extent determined by the instantaneous position of said second member; a control element adapted to effect change of said pressure; and means for effecting actuation of said control element under conjoint control of said first and second members whereby the extent of actuation of said control element will vary in dependence upon the relative values of deviation and rate.

9. In apparatus for automatically maintaining a predetermined condition, the combination of a rotatable and axially movable potentiometer drum; a slide wire mounted on said drum, a galvanometer having a movable armature; a slide engageable with said slide wire for completing a circuit through said galvanometer; a galvanometer pointer; means for releasably connecting said pointer to the galvanometer armature; means for moving said potentiometer drum axially to engage said pointer when the latter is in a position of deviation to free said pointer from said armature and clamp it to the drum; means for intermittently moving said pointer and drum about the axis of the latter thereby to balance said potentiometer; a device mounted for movements to positions dependent on the total extent of balancing movement; a second device adapted successively to assume positions dependent on the successive extents of balancing movement; means responsive to an extent dependent on the position of the first device; means independently responsive to an extent dependent on the instantaneous position of the second device; a control element adapted to effect change of said condition; and mean for actuating said control element under the conjoint control of said means whereby the extent of actuation will vary in dependence on the relative values of rate and deviation of said condition.

10. In apparatus for automatically maintaining a predetermined condition, the combination of a rotatable and axially movable potentiometer drum; a slide wire mounted on said drum; a galvanometer having a movable armature; a slide engageable with said slide wire for completing a circuit through said galvanometer; a parallelogram linkage for supporting said slide, said linkage maintaining said slide in contact with said slide wire and permitting movements of the slide substantially parallel to the axis of the drum simultaneously with axial movements of the drum; a galvanometer pointer; means for releasably connecting said pointer to the galvanometer armature; means for moving said potentiometer drum axially to engage said pointer when the latter is in a position of deviation to free said pointer from said armature and clamp it to the drum; means for intermittently moving said pointer and drum about the axis of the latter thereby to balance said potentiometer; a device mounted for movements to positions dependent on the total extent of balancing movement; a second device adapted successively to assume positions dependent on the successive extents of balancing movement; means responsive to an extent dependent on the position of the first device; means independently responsive to an extent dependent on the instantaneous position of the second device; a control element adapted to effect change of said condition; and means for actuating said control element under the conjoint control of said means whereby the extent of actuation will vary in dependence on the relative values of rate and deviation of said condition.

11. In apparatus for automatically controlling temperature of a body, the combination of an element for controlling the application of heat to the body; two independent means for operating said control element; a differential gearing interposed between said control element and said two independent means respectively for transmitting the net driving effect of the independent means to said control element; and means for controlling the operation of said independent means including a device associated with one of said independent means and being responsive to the extent of deviation of temperature from a predetermined value and means associated with the other of said independent means and being responsive to the rate of deviation of temperature from said predetermined value.

12. In apparatus for automatically controlling pressure of a fluid, the combination of an element for controlling the application of heat to the fluid; two independent means for operating said control element; a differential gearing interposed between said control element and said two independent means respectively for transmitting the net driving effect of the independent means to said control element; and means for controlling the operation of said independent means including a device associated with one of said independent means and being responsive to the extent of deviation of pressure from a predetermined value and means associated with the other of said independent means and being responsive to the rate of deviation of pressure from said predetermined value.

13. In apparatus for automatically maintaining the temperature of a body at a predetermined value, the combination of an element for controlling the application of heat to said body; means movable in response to extent of deviation from said value; means movable in response to rate of deviation from said value; and a differential gearing for transmitting the resultant of said movements to said control element.

14. In apparatus for automatically maintaining the pressure of a fluid at a predetermined value, the combination of an element for controlling the application of heat to said fluid; means movable in response to extent of deviation from said value; means movable in response to rate of deviation from said value; and a differential gearing for transmitting the resultant of said movements to said control element.

15. The combination with a device mounted for movements to show visibly the extent of deviation of a physical condition from a predetermined value; of an electrical network which is in electrical balance when there is no deviation from said value; means in circuit with said net work for unbalancing it in response to a deviation from said value; an electrically actuated device deflectible in response to and to an extent dependent upon the out-of-balance value of the network; a member having driving connection with said movable device and being movable to effect balancing of said net work; means for clamping said member to said electrically actuated device when the latter is in deflected position; and means for returning said electrically actuated device to its normal position thereby moving said member to effect rebalancing of said net work.

16. The combination with a device mounted for movements to show visibly the extent of deviation of a physical condition from a predetermined value; of an electrical network which is in electrical balance when there is no deviation from said value; means in circuit with said net work for unbalancing it in response to a deviation from said value; a galvanometer in circuit with said network; a galvanometer armature adapted to occupy a zero position when the net work is balanced and which is deflectible in response to and to an extent dependent upon the out-of-balance value of the net work; a galvanometer pointer having releasable connection with said armature; a member having driving connection with said device and being movable to effect balancing of said net work; means for clamping said member to said pointer and for releasing the pointer from said armature when the latter is in deflected position; and means for returning said pointer to its normal position thereby moving said member to effect rebalancing of said net work.

17. The combination with a device mounted for movements to show visibly the extent of deviation of a physical condition from a predetermined value; of an electrical net work which is in electrical balance when there is no deviation from said value; means in circuit with said net work for unbalancing it in response to a deviation from said value; a galvanometer in circuit with said net work; a galvanometer armature adapted to occupy a zero position when the net work is balanced and which is deflectible in response to and to an extent dependent upon the out-of-balance value of the net work; a hook like support on said armature; a pointer normally carried by said support; a member having driving connection with said device and being mounted for rotary movements for effecting balancing of said net work and for axial movement into clamping relation with said pointer; means for moving said member axially to clamp said pointer and to release said pointer from said hook support when said armature is in deflected position; and a periodically movable arm engageable with said pointer for returning it to its normal position, thereby rotating said member to an extent dependent upon the preceding deflection of said armature to effect rebalancing of said net work.

18. Apparatus as set forth in claim 17 in which the electrical net work includes a potentiometer comprising a slide wire and a slide, one of which is mounted on said rotatably and axially movable member and the other of which is fixed against rotation.

19. Apparatus as set forth in claim 17 in which the electrical net work includes a potentiometer comprising a slide wire mounted on said rotatably and axially movable member and a slide fixed against rotary movement but being movable parallel to the axis of said rotatable member simultaneously with axial movement of the latter.

In testimony that we claim the foregoing as our invention, we have signed our names this 13th day of August, 1931.

JOHN LAWRENCE HODGSON.
ALEXANDER IVANOFF.
GILES PHILIP ELIOT HOWARD.